Feb. 18, 1930.　　　A. SIMONS　　　1,747,911
HEADING DIE
Filed June 23, 1927

INVENTOR
ABRAHAM SIMONS
BY Mock & Blum
ATTORNEYS

Patented Feb. 18, 1930

1,747,911

UNITED STATES PATENT OFFICE

ABRAHAM SIMONS, OF NEW YORK, N. Y.

HEADING DIE

Application filed June 23, 1927. Serial No. 200,852.

My invention relates to a new and improved die.

One of the objects of my invention is to provide a heading die including a die for making the heads of bolts or the like, said die having an operating member made of suitable hardened tool steel, said operating member being of relatively small size and being separate from the rest of the device.

Another object of my invention is to provide a die construction in which an operating member made of properly hardened steel is held in position in an exterior shell or holder made of a different composition or grade of steel.

Another object of my invention is to provide a die construction which will be of minimum cost and which will greatly increase the life of the operating member.

Other objects of my invention will be set forth in the following description and drawings which illustrate a preferred embodiment thereof, it being understood that the above general statement of the objects of my invention is intended merely to generally explain the same and not to limit it in any manner.

Heading dies and dies of similar description have been heretofore very largely used for manufacturing bolts, rivets and the like. Such heading dies have heretofore been made of large pieces of hardened tool steel, which is an expensive material. Although this hardened tool steel was suitable for shaping the head of a die, the shank of a die or the like, the hardness of this tool steel necessarily lowered its tensile strength so that dies so constructed did not have a very long life.

Figure 1:
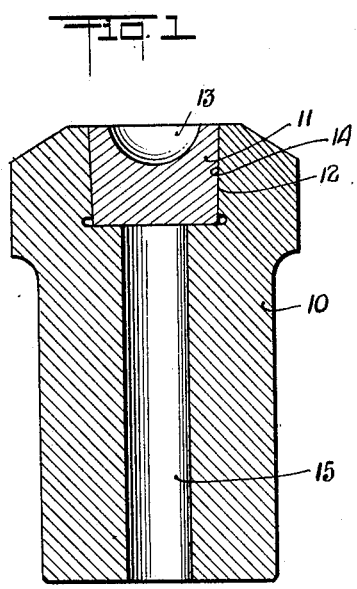
Fig. 1 is a sectional view of an embodiment of my device.
Figure 2:
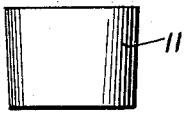
Fig. 2 is a side elevation of the heading member.

According to my invention the die is provided with a body member or shell 10 which is suitably held in place in a suitable machine. This shell 10 is provided with a recess 12, the wall of which has a very slight taper. The operating member 11 is provided with a recess 13 which has any suitable shape, corresponding to the nature of the article to be made. The operating member 11 which is made of hardened tool steel is provided with a tapered wall 14 which has a taper corresponding generally to the taper of the wall of the recess 12. The bottom of the recess 12 is provided with an enlarged extension as clearly shown in Fig. 1.

The operating member 11 is made somewhat oversized so that it requires considerable pressure to force it into position. This pressure may be as high as from fifteen (15) to twenty-five (25) tons and the member 11 is forced into position while it is in the cold condition.

This causes the adjacent wall of the shell 10 to be subjected to an outward lateral stress which subjects the said material of the shell 10 to considerable tension. The taper of the wall of the recess 12 and the corresponding outer wall of the operating member 11 is so slight that the reaction of the tensed material is insufficient to force the operating member 11 out of the position into which it has been driven into the shell 10.

Hence, the reaction of the material of the shell 10 subjects the operating member 11 to a very powerful inward lateral pressure which is directed on all sides to the central axis of the operating member 11.

This powerful inner lateral pressure counterbalances the outer lateral pressure caused by the use of the member 11 so that the operating member 11 can be made of a relatively small piece of hardened tool steel and has a relatively very long life.

The shell 10 can be provided with a recess 15 through which a suitable ejector pin of the ordinary type may be inserted to eject the work from the member 11.

The exterior shell 10 is made of a steel which is more ductile than the operating member, so that said shell can resist the outer stresses produced by the operation of the device.

I have shown a preferred embodiment of my invention, but it is clear that numerous changes and omissions could be made without departing from its spirit.

I claim:

A die comprising an outer shell having a recess at one end thereof, the said recess having an outwardly tapered wall, and an operating member located in said recess and having a tapered wall whose contour corresponds to the contour of the tapered wall of the said recess, the said operating member being oversized, the material of the said shell adjacent the said operating member being in a state of tension and exerting an inwardly directed lateral force upon all sides of the said operating member, the said operating member having a recess in the outer end thereof which is located within the recess of the shell, so that the wall of the recess of said operating member is subjected to a continuous inner stress by the wall of the recess of the shell.

In testimony whereof I affix my signature.

ABRAHAM SIMONS.